US006037686A

United States Patent [19]

Schönauer et al.

[11] Patent Number: 6,037,686

[45] Date of Patent: Mar. 14, 2000

[54] CURRENT COMPENSATED CHOKE FILTER FOR MULTI-PHASE MOTOR DRIVES

[75] Inventors: Uwe Schönauer; Robert Oesterle; Christoph M. Ernecke, all of Berlin, Germany

[73] Assignee: Otis Elevator Company, Farmington, Conn.

[21] Appl. No.: 09/247,735

[22] Filed: Feb. 9, 1999

[51] Int. Cl.[7] ........ H02K 11/00; H01F 17/00

[52] U.S. Cl. ........ 310/72; 310/68 R; 336/160

[58] Field of Search ........ 336/160, 5, 12, 336/155; 310/68 R, 72

[56] References Cited

U.S. PATENT DOCUMENTS

| | | | |
|---|---|---|---|
| 3,123,764 | 3/1964 | Patton | 336/160 |
| 4,129,820 | 12/1978 | Brock | 336/12 |
| 4,663,700 | 5/1987 | Kahkipuro | 363/54 |
| 4,853,664 | 8/1989 | Asakura | 336/12 |
| 4,907,246 | 3/1990 | Kleiner | 323/335 |
| 5,525,951 | 6/1996 | Sunano et al. | 336/160 |

*Primary Examiner*—Nestor Ramirez
*Assistant Examiner*—Burton Mullins

[57] ABSTRACT

Each torque-producing phase current of a multi-phase motor is passed through a filter which includes an R/C shunt to ground and a series, current-compensated choke. Each choke has a winding in series with each phase so that the net current generated by phase currents in the windings is zero, and therefore the net flux generated by phase currents in the highly permeable core of the choke is zero at all times. However, there is significant inductive reactance created by the non-counterbalanced motor leakage currents, which prevent leakage currents from circulating through the motor. Thus, torque-producing motor currents can accurately be measured for feedback, without pollution from leakage currents. LEM current transducers allow use of small, proportional currents in the measuring and suppress inter-phase coupling.

13 Claims, 3 Drawing Sheets

CURRENT COMPENSATED CHOKE FILTER FOR MULTI-PHASE MOTOR DRIVES

TECHNICAL FIELD

This invention relates to a choke filter which separates the main current flow through a multi-phase motor from the motor leakage currents by leaving only flux created by the leakage current to induce inductive reactance that blocks the leakage current from motor current measuring devices.

BACKGROUND ART

Elevators of moderate speed, typically used in medium height buildings, are conventionally geared machines. The ripple in torque which may be created by leakage currents in the motor is fairly well damped out by the effect of the gears, which not only reduce the physical effect on the cab through the gear ratio, but also have a significant damping effect. However, the same is not true in higher speed gearless machines. It has been found that the leakage currents resulting from inevitable ground capacitance of each of the phases of a multi-phase motor driven by a fast switching frequency inverter introduce errors into the measurement of current of each phase, which is used to control the motor drive. This systematic current error can cause torque ripple at low, mechanically-relevant frequencies, thus leading to considerable elevator vibration.

DISCLOSURE OF INVENTION

Objects of the invention include elimination of current measurement errors in the control of multi-phase motors; reduction of vibration in gearless elevators; reduction of torque ripple at low, mechanically-relevant frequencies in systems driven by multi-phase motors in response to fast-switching frequency inverters; and improved compensation for multi-phase motor leakage currents.

This invention is predicated on the concept that the sum of the torque-producing phase currents flowing into a multi-phase motor must equal zero, whereas the leakage currents flowing into the motor return to the source via a ground path.

According to the invention, the torque-producing current is separated from the leakage current in each phase by using a current-compensated choke in the measurement filter; the choke has an equally proportioned winding for each phase on a highly permeable ring core, each phase having its own core as part of a leakage current filter, the currents of all the phases and therefore the corresponding flux induced in the cores, all sum to zero.

According to the present invention, a filter using a qualitative difference between the torque-producing phase currents of the motor and the capacitative leakage currents allows measurement of the torque-producing currents without pollution by the leakage currents, which are bypassed.

With the invention, the magnetic flux induced in the core by torque-producing phase current flowing through one phase of the motor is counteracted by flux induced in the core of the current flowing through the other phases of the motor. The resulting flux generated by torque-producing phase currents is always zero, so the inductance of the coil is very low for the torque-producing currents. In contrast, the leakage currents, being not counteracted by any adverse currents in the coil, cause large flux variations in the core. Thus, the coil presents a large inductive reactance to the leakage currents, thereby substantially blocking the leakage currents. The resulting filter allows measuring the torque-producing current with essentially no pollution by leakage current.

The invention is more effective than a filter using only frequency as a criterion for separation of the currents. The invention responds to relatively small, easy to handle currents, and therefore is smaller and cheaper than primary-side filters. The invention is less expensive and more effective than the reduction of leakage capacitances in the motor which could be affected by improvements in motor design and manufacture.

When used in gearless elevator motor systems, current feedback control is improved by eliminating errors caused by leakage current in the measurements, thereby significantly reducing vibrations and improving the quality of the ride.

Other objects, features and advantages of the present invention will become more apparent in the light of the following detailed description of exemplary embodiments thereof, as illustrated in the accompanying drawing.

BEST MODE FOR CARRYING OUT THE INVENTION

Figure 1:
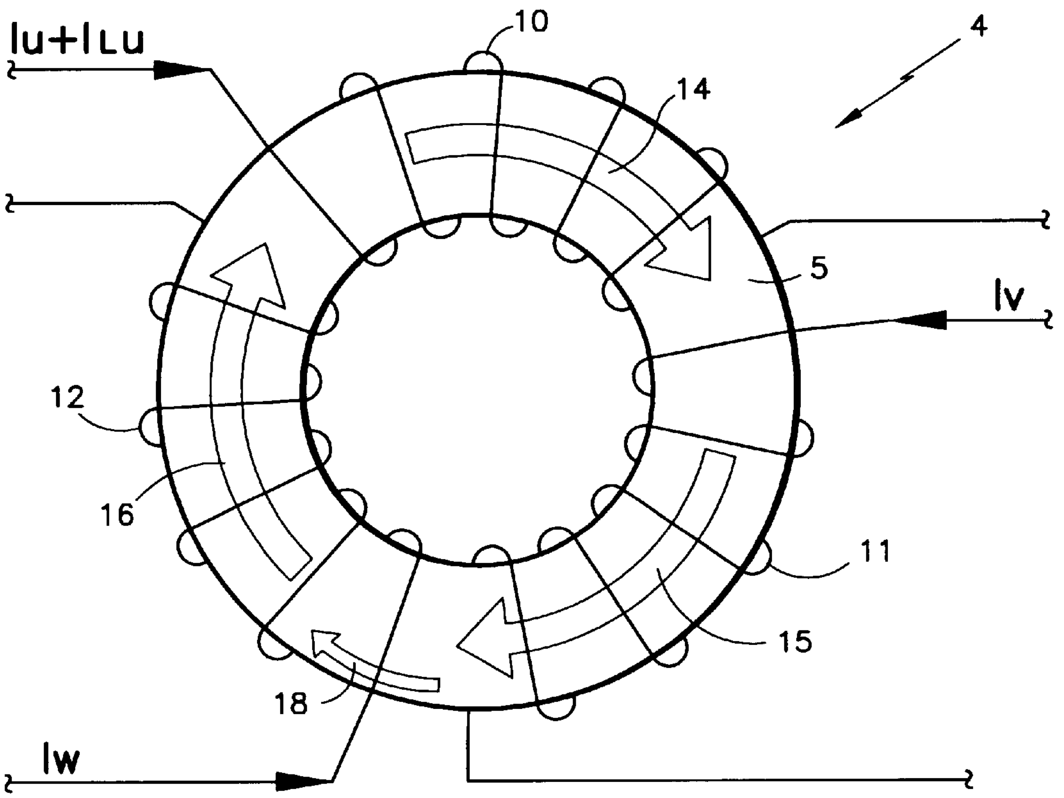
FIG. 1 is a view of a current compensated choke according to the invention.

Referring to FIG. 1, a choke 4 of the present invention comprises a highly permeable magnetic ring core 5 having three identical windings 10–12 thereon. The choke 4, as applied to one phase of a three-phase motor, would have currents for each of the phases lu, lv, lw applied to corresponding coils 10–12 as shown. The sum of the currents lu, lv, lw, is zero, as is known. Therefore, the flux generated by the current lu in coil 10, illustrated by the arrow 14, is compensated for by the summation of the flux created by the current lv in the coil 11, represented by the arrow 15, with the flux created by the current lw in the coil 12, represented by the arrow 16. The arrows 14–16 indicate polarity of flux in response to currents flowing in the direction of the arrows within the coils 10–12. At any point in time, the current in one coil is generally of opposite polarity to the currents in the other two coils, and the vector summation of currents in the three coils 10–12 is zero. Thus, the net flux in the core 5 as a consequence of the torque-producing currents is zero. However, the leakage current to ground within the motor, resulting from lu through the coil 10 will return to the drive circuitry through ground (rather than through the other coils) so it will produce an uncompensated flux illustrated by the arrow 18. Since the net flux represented by arrows 14–16 is zero, the core 5 will be highly permeable (totally unsaturated) to the leakage currents, thereby highly magnetically responsive thereto. As a consequence, the time varying leakage currents will induce significant inductive reactance within the coil 10 from the resulting inductance of the highly permeable core 5.

The choke 4 therefore represents a selective choke, being essentially invisible (except for small ohmic losses) to the torque-producing currents, but having a large retardant effect on the leakage currents.

Figure 2:
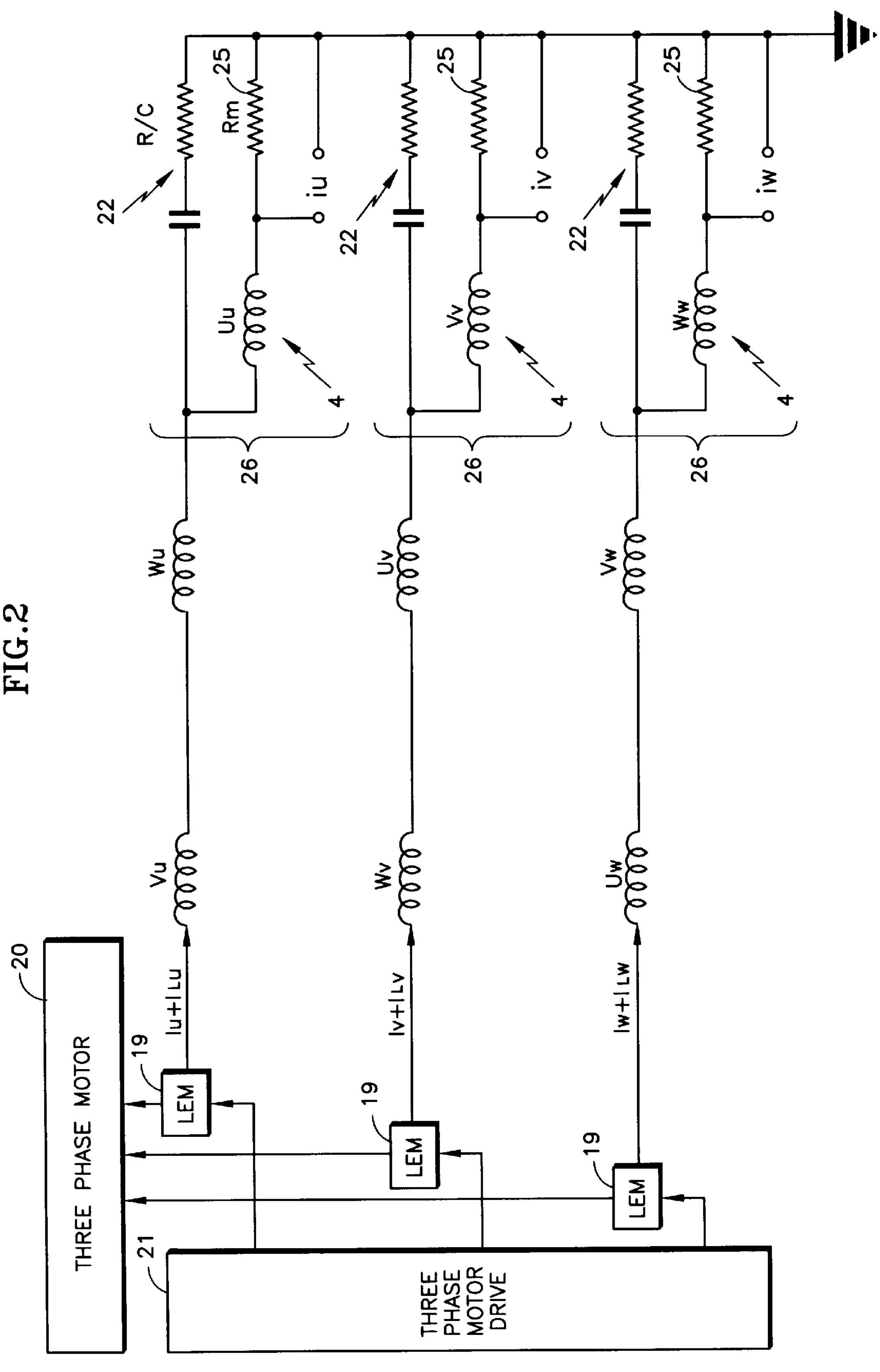
FIG. 2 is a schematic block diagram of a measurement circuit connected to a three-phase motor drive system utilizing filters employing the choke of FIG. 1.
Figure 3:
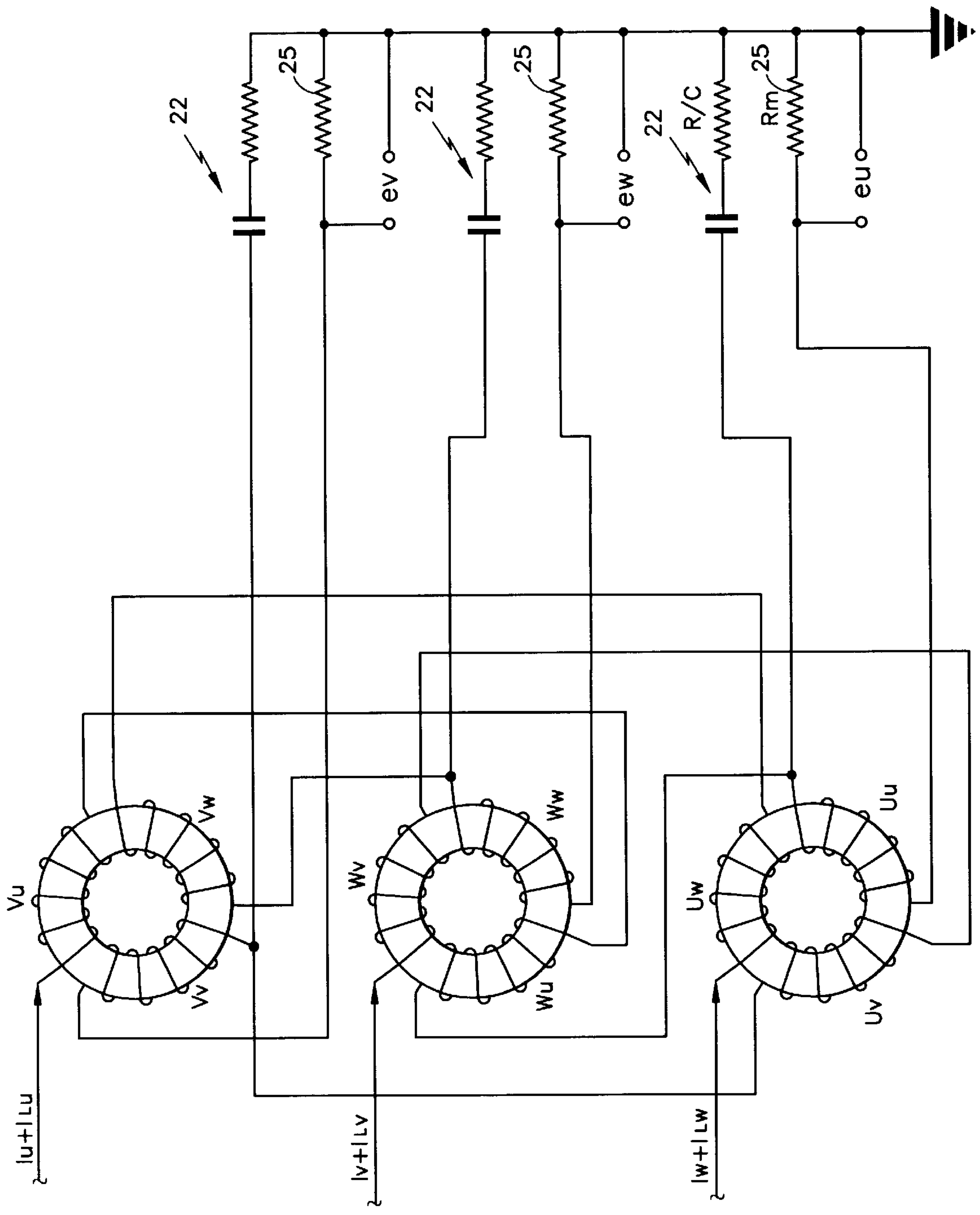
FIG. 3 is a partial alternative to the diagram of FIG. 2, illustrating windings on the cores of the chokes.

Referring to the measurement apparatus of FIG. 2, for each of the three phases U, V, W, a current lu, lv, lw is provided by a corresponding, conventional current-to-current transducer 19, such as a conventional LEM transducer, to decouple the measurement apparatus from the motor drive circuit. The current provided to the measurement apparatus is a low current proportional to the motor phase current provided to the three phase motor 20 by a three phase motor drive 21. Each phase has a filter 26, adjacent to a current measuring device, such as a measuring resistor 25, which includes a current compensated choke 4 of the invention and a series resistor/capacitor shunt 22 to ground which provides a current path for the leakage currents that are blocked by the choke 4. As seen in FIG. 3, on each of the chokes 4, there is a winding Uu, Vv, Ww for a corresponding phase, and a winding Uv, Uw; Vu, Vw; and Wu, Wv for each of the other phases. Thus the chokes 4 are provided windings for the phase currents as described hereinbefore with respect to FIG. 1. Therefore, each of the chokes 4 is invisible (essentially) to all of the currents corresponding to phase currents, since all of the flux resulting from the phase currents, that is, the flux corresponding to the torque-producing currents, is cancelled out. On the other hand, in each of the chokes 4, the flux resulting from motor leakage currents (shown by arrow 18 in FIG. 1) is significant, thereby generating significant inductive reactance so that the leakage currents are shunted to ground through the shunts 22 around the measuring resistors 25 so the leakage currents cannot affect the voltages eu, ev, ew across the measuring resistors 25.

Due to the selective properties of the current-compensated choke, the cutoff frequency for the torque-producing currents in the measurement branch is much higher (beyond any frequencies utilized to drive motors) than is the cut-off frequency for the leakage currents. As a result, the torque-producing phase currents to a three-phase motor 20 may be measured by corresponding measuring resistors 24 without any significant measurement components attributable to leakage currents.

In the embodiment of FIG. 2, the filters 26 are connected to the three-phase motor drive 20 by LEMs 19. The LEMs 19 not only allow use of low-current capacity measuring apparatus, but also as current sources, stabilizing the current in the choke coils of each phase, so peak values of leakage current blocked by the choke in any phase does not couple into the other phases.

In the embodiments herein, the core 5 is shown as a circular toroid; however, it could be a square or other shaped toroid, and its cross-sectional configuration is essentially irrelevant to the invention. Thus, the parameters of the core 5 can be chosen to suit any implementation of the present invention, so long as it has high permeability. The current between each choke and ground can be measured by another suitable measuring device, such as a Hall device, rather than measuring the voltage across the measuring resistors 25. The invention may be used to measure current in less than all of the phases of a multi-phase motor.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:

1. A current-compensated choke for use in measuring currents driving a multi-phase electric motor, comprising:

a highly permeable magnetic core; and a winding on said core for each phase of said motor, said windings being mutually oriented so that the flux generated in said core by torque-producing phase currents applied to said motor in any of said windings is cancelled by the flux generated in said core by the torque-producing phase currents flowing in the other of said windings, so that the net flux generated by torque-producing phase currents in said core is nil, whereby there is substantially no inductive reactance to torque-producing phase currents flowing through said choke, but significant inductive reactance is generated in response to any motor leakage currents which may tend to be induced in said motor by torque-producing phase currents applied to said motor.

2. A choke according to claim 1 wherein there are three windings on said core respectively corresponding to three phases of a motor.

3. A choke according to claim 1 wherein said core is a ring core.

4. A choke according to claim 1 wherein said core is a toroidal core.

5. Apparatus for measuring torque-producing phase currents to a multi-phase motor having a winding for each phase in which said torque-producing phase currents tend to induce leakage currents in said motor, said apparatus for connection between said motor and corresponding multi-phase motor drive circuitry, said apparatus comprising:

a plurality of current measuring devices, one for each of said phases; and a plurality of filter elements, one for each of said phases, each of said filter elements responsive to a related torque-producing phase current provided by said motor drive circuitry to said motor for the corresponding phase, each of said filter elements comprising:

a current compensated choke connected in series with a corresponding one of said current measuring devices; and a series resistor/capacitor circuit connected in parallel with each series combination of said choke and said current measuring device;

each of said current compensated chokes comprising:

a highly permeable magnetic core; and a winding on said core for each phase of said motor, said windings being mutually oriented so that the flux generated in said core in response to torque-producing phase currents flowing in any of said windings of said motor is cancelled by the flux generated in said core in response to the torque-producing phase currents flowing in the other of said windings, so that the net flux generated in response to torque-producing phase currents in said core is nil, whereby there is substantially no inductive reactance to torque-producing phase currents flowing through said choke, but significant inductive reactance is generated in response to any motor leakage currents which may tend to be induced in said motor by torque-producing phase currents applied to said motor.

6. A filter according to claim 5 wherein said motor is a three-phase motor and there are three filter elements with three coils on each of said cores.

7. A filter according to claim 5 wherein said cores are ring cores.

8. A filter according to claim 5 wherein said cores are toroidal cores.

9. A filter according to claim 5 further comprising:

a plurality of current-to-current transducers, one for each of said phases, each connected in circuit between the corresponding phase of said multi-phase motor drive circuit and the like phase of said multi-phase motor, each providing, to the corresponding one of said chokes, said current which is proportional to the corresponding torque-producing phase current.

10. A filter according to claim 9 wherein said current-to-current transducers provide currents to said chokes which are lower than the corresponding torque-producing phase currents.

11. A filter according to claim 9 wherein said current-to-current transducers comprise current sources.

12. A filter according to claim 9 wherein said current-to-current transducers comprise LEM current-to-current transducers.

13. Apparatus for measuring torque-producing phase current flowing through a particular winding of a multi-phase motor having a winding for each phase in which said torque-producing phase current tends to induce leakage currents in said motor, said apparatus comprising:

a current measuring device; and a filter element responsive to the torque-producing phase current provided by motor drive circuitry to said particular winding, said filter element comprising:

a current compensated choke connected in series with said current measuring device; and a series resistor/capacitor circuit connected in parallel with the series combination of said choke and said current measuring device;

said current compensated choke comprising:

a highly permeable magnetic core; and a winding on said core for each phase of said motor, said windings being mutually oriented so that the flux generated in said core in response to torque-producing phase currents flowing in any of said windings of said motor is cancelled by the flux generated in said core in response to the torque-producing phase currents flowing in the other of said windings, so that the net flux generated in response to torque-producing phase currents in said core is nil, whereby there is substantially no inductive reactance to torque-producing phase currents flowing through said choke, but significant inductive reactance is generated in response to any motor leakage currents which may tend to be induced in said motor by torque-producing phase current applied to said particular winding.

* * * * *